United States Patent

[11] 3,562,525

| [72] | Inventors | Nikiforos Constantine<br>St. Paul;<br>Larry L. Hobbs, Maplewood, Minn. |
|---|---|---|
| [21] | Appl. No. | 649,911 |
| [22] | Filed | June 29, 1967 |
| [45] | Patented | Feb. 9, 1971 |
| [73] | Assignee | Minnesota Mining and Manufacturing Company<br>St. Paul, Minn.<br>a corporation of Delaware |

[54] X-RAY FLUORESCENCE GAUGING EMPLOYING A SINGLE X-RAY SOURCE AND A REFERENCE SAMPLE FOR COMPARATIVE MEASUREMENTS
5 Claims, 8 Drawing Figs.

[52] U.S. Cl. .................................................. 250/51.5,
250/83.3
[51] Int. Cl. .................................................. G01t 1/16
[50] Field of Search .......................................... 250/59,
83.3D, 51.5

[56] References Cited
UNITED STATES PATENTS

| 2,711,480 | 6/1955 | Friedman .................. | 250/59 |
| 2,926,257 | 2/1960 | Friedman .................. | 250/83.3D |
| 3,012,140 | 12/1961 | Pellissier et al. ............ | 250/51.5 |
| 3,409,774 | 11/1968 | Dykeman .................. | 250/59 |

Primary Examiner—Archie R. Borchelt
Assistant Examiner—C. E. Church
Attorney—Kinney, Alexander, Sell, Steldt & DeLaHunt

ABSTRACT: An x-ray fluorescence gauge wherein an x-ray beam is separated into two beams for concurrently irradiating a coating and base and a reference sample each of which contain elements capable of producing fluorescent characteristic radiation when irradiated by one of the x-ray beams is shown. A pair of detectors receive the characteristic fluorescent radiation, with at least the characteristic radiation from the coating and base element passing through a filter, and the outputs from the detectors are applied to a ratio counter which includes means for indicating the ratio of radiation counts.

INVENTORS
NIKIFOROS CONSTANTINE
LARRY L. HOBBS
BY Carpenter, Kinney & Coulter
ATTORNEYS

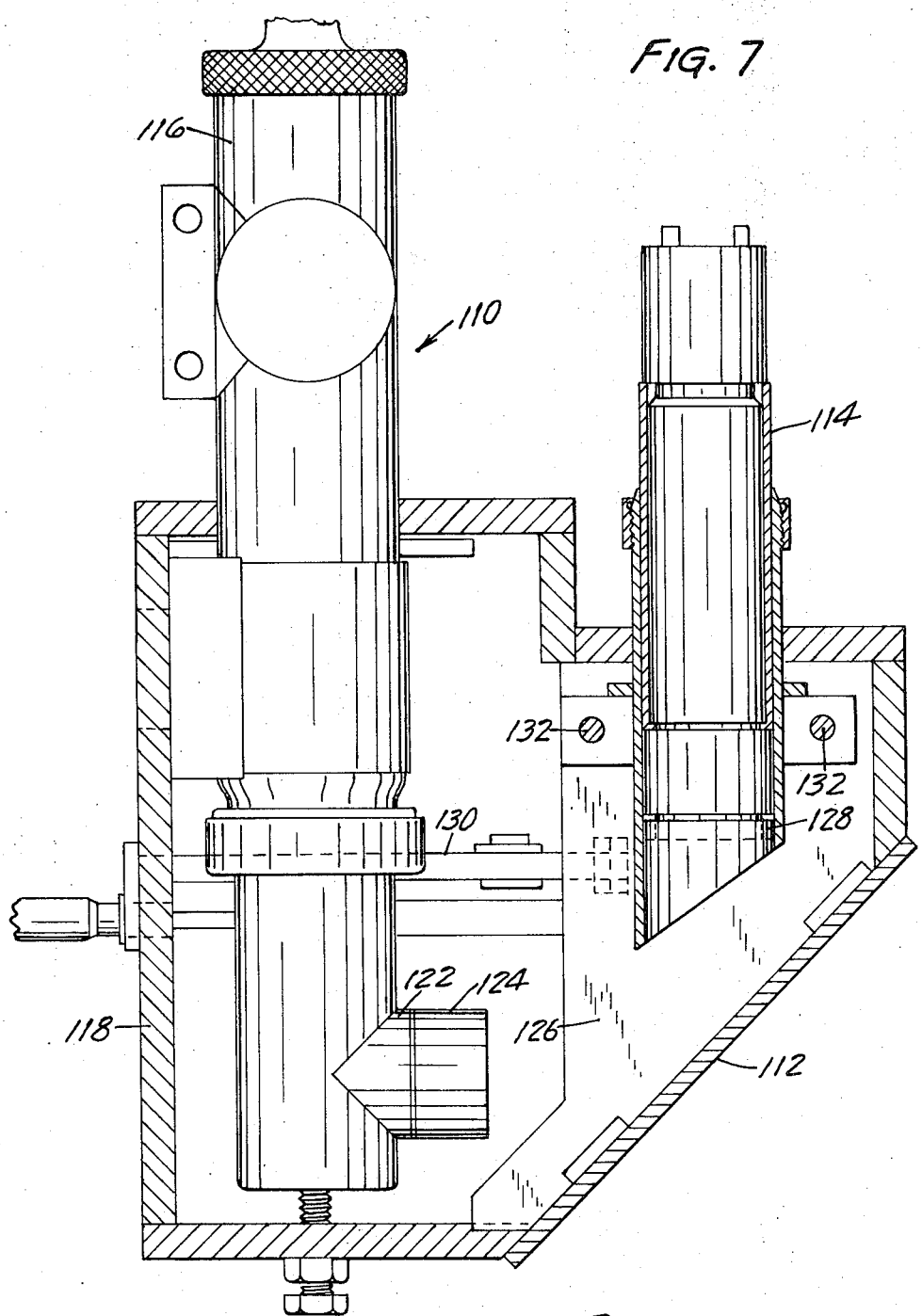
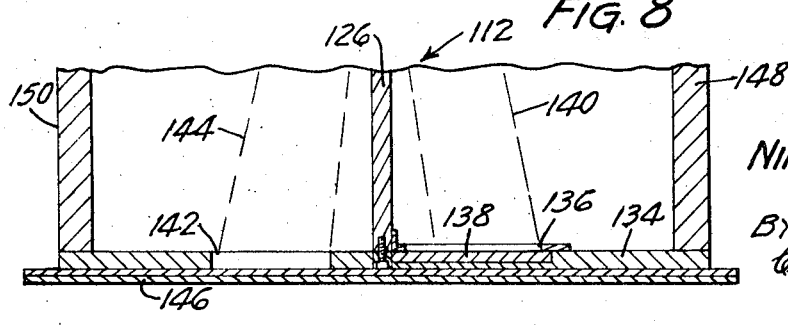

X-RAY FLUORESCENCE GAUGING EMPLOYING A SINGLE X-RAY SOURCE AND A REFERENCE SAMPLE FOR COMPARATIVE MEASUREMENTS

Apparatus for measuring the thickness of a coating on a moving base by means of x-ray fluorescent radiation is shown by the prior art, for example, U.S. Pat. No. 3,012,140 to Pellissier and U.S. Pat. No. 2,926,257 to Friedman.

U.S. Pat. No. 3,012,140 discloses an apparatus for measuring the thickness of tin coating on a steel strip. From an x-ray tube, x-rays are directed toward a steel diaphragm having an opening through which some x-rays are passed to penetrate the tin coating. The steel base is thus energized to emit fluorescent radiation. The portion of fluorescent radiation passing through the tin coating, and received by a first detector, is inversely proportional to the thickness of the tin coating. At the same time, the x-rays striking a diaphragm cause fluorescent radiation which is received by a second detector. The fluorescent radiation from the diaphragm is compared with the fluorescent radiation passed through the tin coating which difference is indicative of the thickness of tin coated on the steel strip. The geometrical positioning of the various components thereby produces a ratio of radiation counts independent of web flutter and the like.

U.S. Pat. No. 2,926,257 relates to an apparatus utilizing a single x-ray beam and single pulse height detector for measuring coating thickness. A filter is inserted between the coating and detector to enhance the signal-to-background ratio of the desired characteristic radiation from a coating element. Only a coating element having the lowest atomic number of all the elements in the coating and base can be detected by the apparatus of U.S. Pat. No. 2,926,257.

It is also known to use an x-ray spectrometer for measuring coating weight on a moving base. The spectrometer measuring apparatus uses dispersive techniques and operates by selectively directing two predetermined spectral wavelengths of characteristic radiation, emanating from the coating after irradiation by a single x-ray beam, to individual detectors. One spectral wavelength of characteristic radiation is from the element being measured. The other spectral wavelength of characteristic radiation is from some other element in the coating or alternatively backscattered radiation. It is important that the other spectral wavelength radiation is selected to be a radiation whose intensity varies in proportion to the intensity of the irradiating x-ray beam. Output signals from the detectors are applied to a ratio counter wherein a ratio of radiation intensity from each spectral wavelength indicates the selected element concentration.

The prior art gauging apparatuses have certain inherent disadvantages. For example, in U.S. Pat. No. 3,012,140 the standard is a fixed integral part of the apparatus and is particularly designed to compensate for variations in intensity due to web flutter. Additionally, in U.S. Pat. No. 3,012,140 the selected element being excited to fluorescence is a base element and the coating, which varies in thickness, absorbs and attenuates the secondary radiation from the base element as a function of coating thickness. Gauge operation in U.S. Pat. No. 3,012,140 is in principle similar to an absorption gauge wherein the source of x-ray radiation is located on one side of the web and the detector is located on the other side of the web. This limits gauge application in that all of the coating elements must be of higher atomic number than the base elements. With this limitation, only the selected element in the base can be excited to emit fluorescent radiation.

In U.S. Pat. No. 22,926,257 the apparatus is limited to a single beam x-ray source and single detector. Further, the apparatus is limited to measuring a coating element having the lowest atomic number relative to all the other elements in the coating and base.

In the x-ray spectrometer apparatus, only a single x-ray beam is used to irradiate the sample. Additionally, diffractors must be positioned at an exact angle to particularly select the proper spectral wavelength of characteristic radiation. The detectors, for determining the radiation counts for each of the characteristic radiations, must be critically positioned relative to the sample and source. Such geometrical considerations severely limit the flexibility of such apparatus for "on line" measurement of a coating thickness on a base.

The x-ray fluorescence gauge of the present invention overcomes the disadvantages of the prior art in that an x-ray fluorescence gauge having a single source is used to produce two spaced x-ray beams for concurrently irradiating a reference sample and a coating and base to produce fluorescent radiation which is processed separately by two detectors. Output signals from the detectors are used to produce a ratio of counts to indicate coating characteristics. The gauge of the present invention is not limited by precise geometrical relations between the source, irradiated materials and detectors thereby resulting in a simple, noncritical, easily calibrated gauge.

Another advantage of the present invention is that the apparatus automatically compensates for variations in x-ray beam intensity, fluctuations in the potential level and the like when the appropriate reference element is selected.

Yet another advantage of the present invention is that trace elements can be used to measure coating thickness after appropriate filtering of the trace element fluorescent radiation.

These and other advantages of the present invention will be readily understood by reference to the embodiment described herein and to the accompanying drawing wherein.

Figure 2:
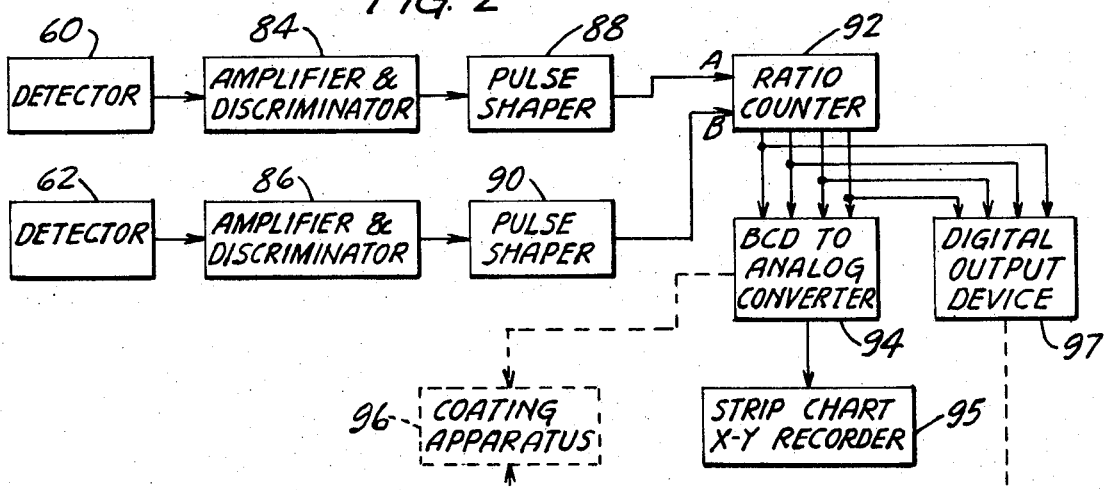
FIG. 2 is a block diagram of an alternate arrangement of a detection circuit used in FIG. 1.
Figure 3:
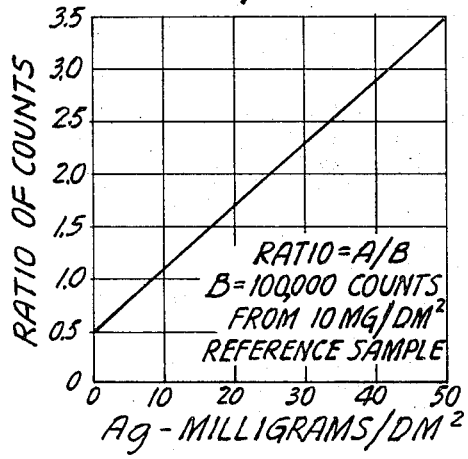
Figure 4:
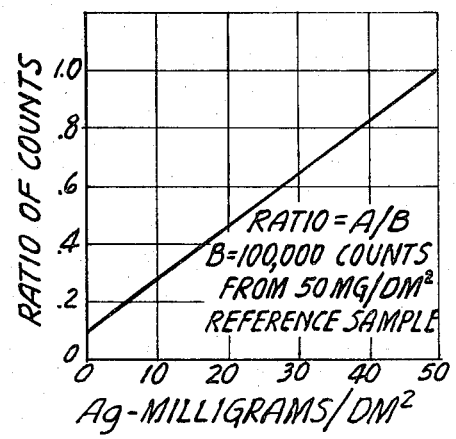
Figure 5:
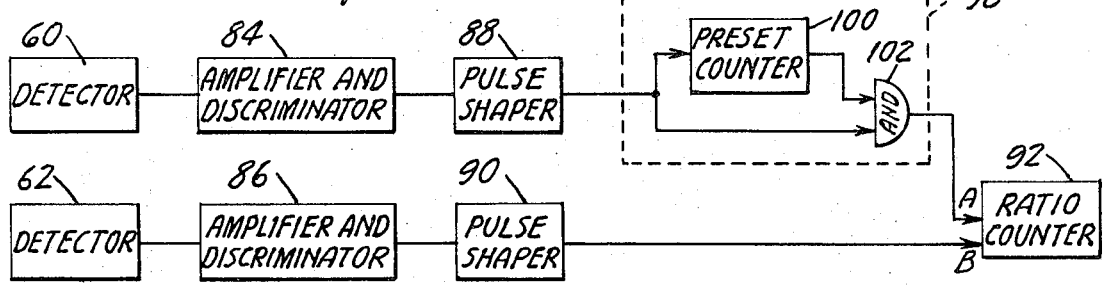
Figure 6:
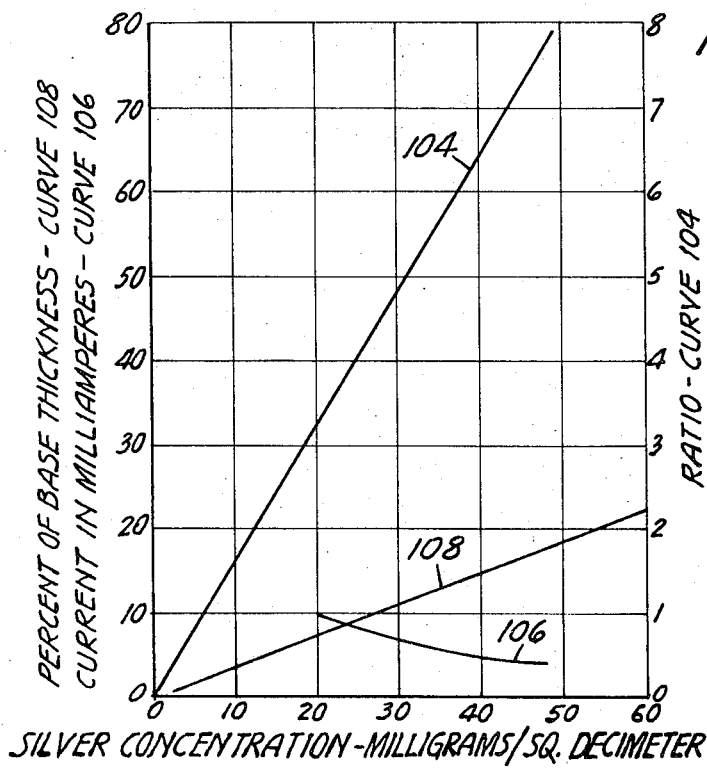

FIG. 3 is a graph representing a ratio of radiation counts of selected silver concentration in milligrams/decimeter$^2$ within a coating on a moving base when the radiation from a reference sample is calibrated relative to the radiation from a 10 milligram/decimeter$^2$ calibration standard used in place of the coating and base material to be subsequently measured by the gauge wherein the ratio of radiation counts therebetween is made equal to one;

FIG. 4 is a graph representing a ratio of radiation counts of selected silver concentration in milligrams/decimeter$^2$ similar to that of FIG. 3 except that a 50 milligram/decimeter$^2$ calibration standard is used;

FIG. 5 is a block diagram of a detection circuit similar to that of FIG. 2 with the addition of a preset count controller;

FIG. 6 is a graph representing signal-to-background ratio for characteristic radiation from various silver concentrations, allowed percentage changes of base thickness and electron beam current in milliamps for one embodiment of the present invention;

FIG. 7 is a diagrammatic representation of an elevational view of an x-ray fluorescence gauging apparatus; and FIG. 8 is a diagrammatic representation of a fragmentary sectional end view of a gauging platform illustrated in FIG. 7.

Briefly, this invention relates to apparatus and method for measuring a selected element within a coating on a base. The apparatus generally includes means for generating a single x-ray beam having an excitation potential which is capable of exciting the selected element to fluorescence. The generating means includes means for separating the x-ray beam into two separate x-ray beams. One of the beams is directed to irradiate the coating on the base and the other of the beams is directed to irradiate a reference sample containing a reference element which is capable of being excited to fluorescence. A first filter is positioned to selectively transmit in a first path characteristic radiation of the selected element with minumum absorption and all other radiation with greater absorption. The reference sample emits and transmits radiation from the reference element in a second path separate from the selected element characteristic radiation being transmitted in the first path. First and second detecting means are positioned on the same side of the coating and base and the reference sample as the generating means. The first detecting means is positioned in the first path for receiving selectively filtered radiation from the first filter and for producing a first output signal representing radiation counts from the selected element. The second detecting means is positioned in the second path for receiving reference element characteristic radiation and for producing a second output signal representing radiation counts from the reference element. A ratio counting means is operatively connected to the first and second detecting means for receiving the first and second output signals for determining a ratio of radiation counts between the selected element and the the reference element when the ratio counting means has received a predetermined number of radiation counts from the reference element.

Figure 1:
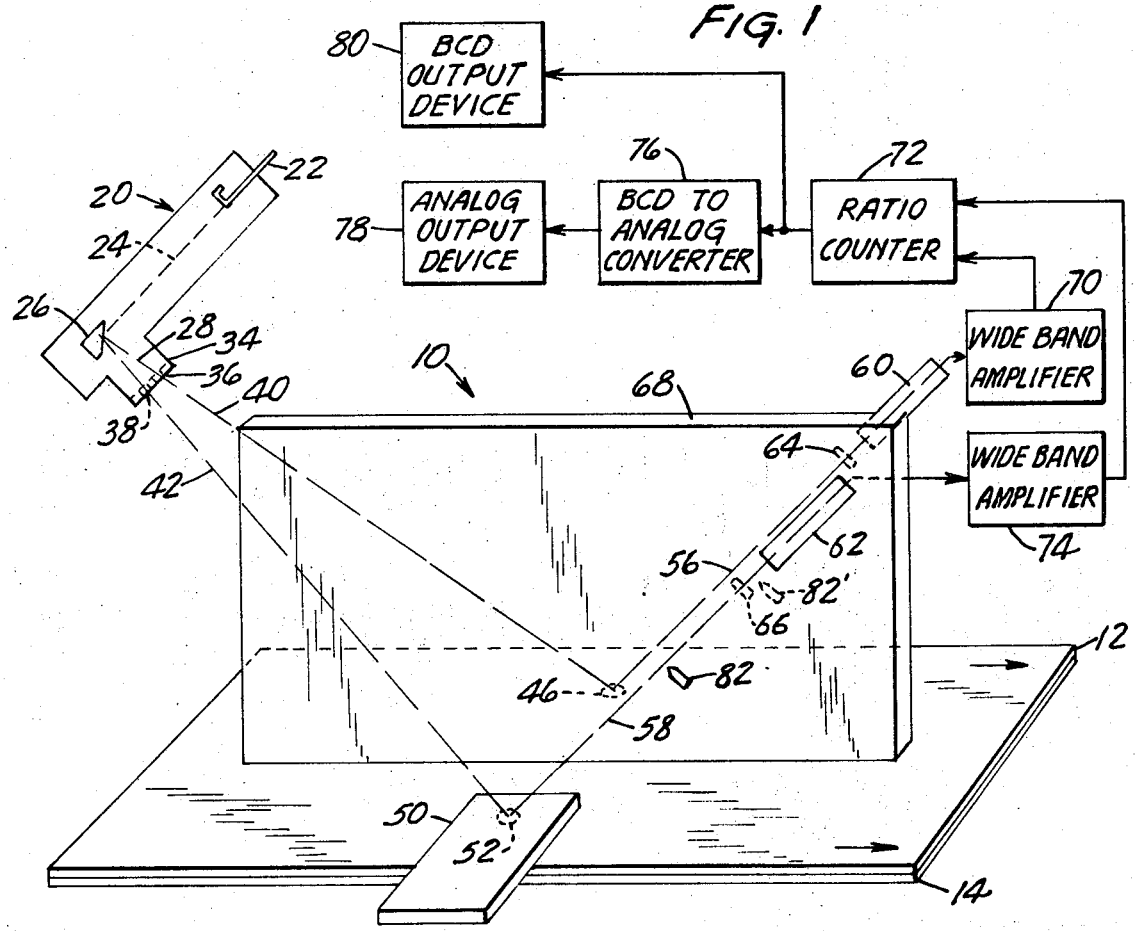
FIG. 1 is a pictorial representation partially in block diagram illustrating the present invention.

The apparatus of FIG. 1 will now be considered. The x-ray fluorescence gauge is generally referred to as 10. The gauge 10 is adapted to continuously measure the thickness of a coating 12 on a base 14, which base may or may not be moving. The coating 12 contains a selected element which can be monitored by the x-ray fluorescence gauge. The density or concentration of the selected element within the coating 12 is proportional to the coating thickness or the coating mass per unit area. The x-ray fluorescence gauge 10 includes an x-ray source 20 as a means for generating an x-ray beam. It is contemplated that the x-ray beam could be either a polychromatic beam or a monochromatic beam. A nonochromatic beam can be produced from a polychromatic beam by known conventional techniques and need not be considered further here. The x-ray source 20 produces x-rays at an excitation potential (energy of the x-ray beam in $keV$) which is capable of exciting the selected element within the coating to fluorescence. The x-ray source 20 illustrated herein is for example an x-ray tube which includes a cathode 22 which is energized from a conventional x-ray generator (not shown). The cathode 22 generates an electron beam 24 which bombards a reflective anode 26 to produce a single x-ray beam 28. A collimator 34, having at least two openings 36 and 38 therein, intercepts the single x-ray beam 28. The collimator 34 separates the single x-ray beam 28 into two separate spaced x-ray beams 40 and 42, the cross-sectional diameter of which is determined by the size of openings 36 and 38. One x-ray beam 40 irradiates the coating 12 and on base 14 at a localized area 46. The other x-ray beam 42 irradiates a reference sample 50 containing a predetermined amount of a reference element, which reference element is selected to be an element capable of being excited to fluorescence by the excitation potential of beam 42. It is preferred, but not necessary, that the reference sample reference element be the same element as the coating and base selected element. The x-ray beam 42 similarly irradiates a localized area 52 on the reference sample 50. The reference sample 50 is positioned over the coating and base and adjacent the localized areal area 46. Thus, localized area 46, irradiated by x-ray beam 40, and localized area 52, irradiated by x-ray beam 42, are in substantially the same plane.

The localized area 46 on coating 12 produces fluorescent characteristic radiation from the selected element, fluorescent characteristic radiation of other elements of different atomic number than the selected element and backscattered radiation, all of which are generally referred to as radiation 56. Concurrently, the localized area 52 on reference sample 50 produces fluorescent characteristic radiation from the reference element, fluorescent characteristic radiation of all other elements of different atomic number than the reference element and backscattered radiation, all of which are generally referred to as radiation 58.

A first detecting means including a first detector 60 which is positioned on the same side of the coating 12 and base 14 as the x-ray source 20 receives the radiation 56 from the localized area 46. Concurrently, a second detecting means including a second detector 62 which is positioned on the same side of the coating 12 and base 14 as the x-ray source 20 and in general alignment with the first detector 60 receives the radiation 58 from localized area 52.

Interposed between the localized area 46 on coating 12 and the first detector 60 is a first single passive filter 64. Similarly, although not necessarily, interposed between the localized area 52 on the reference sample 50 and the second detector 62 is a second single passive filter illustrated by dashed rectangle 66. In the absence of filter 66, the second detector 62 is directly responsive to the radiation counts from the element or elements contained in the reference sample 50. However, when the reference sample 50 is a piece or sample of the coating and base being measured, it is preferred to use the second filter 66. The remaining description of FIG. 1 will consider the apparatus as using both filters 64 and 66.

The selection of the filter elements can be made based on known techniques. For example, each single passive filter 64 and 66 comprises a preselected element which nondispersively filters out most of the radiation 56 and 58 respectively. Nondispersively filtering means that the radiation which passes through the filter is passed or transmitted at its various wavelengths without altering the direction of propagation of the radiation as a function of its wavelength.

Each filter 64 and 66 is selected to have a predetermined thickness and an x-ray absorption edge wavelength slightly shorter than the characteristic wavelength of the fluorescent radiation emitted by the selected element and reference element respectively. The predetermined thickness of each filter is selected such that each filter selectively transmits fluorescent radiation from the particular element, the selected element for filter 64 and the reference element for filter 66, at its characteristic wavelength with a known percent of absorption and the background and backscattered radiation with a greater percent of absorption to establish a desired ratio therebetween for the particular excitation potential or voltage of the x-ray beams 40 and 42 respectively. It has been determined by experimentation with one embodiment of an x-ray gauge that characteristic radiation from the selected element having a signal-to-background ratio in the order of 3:1 is sufficient to provide relatively accurate gauge operation. With a 3:1 signal-to-background ratio, gauging of the coating thickness is generally independent of substantial changes in base material thickness. It is preferred, but not necessary, that the filters 64 and 66 be selected from a material having an atomic number which is equal to that of the selected element when the reference element and selected element are selected to be the same element.

The detectors 60 and 62 are positioned relative to the filters 64 and 66 respectively for receiving the selectively filtered radiation 56 and 58 in a first and second path respectively. Detector 60 is particularly responsive to the radiation having the greatest intensity, which radiation is the fluorescent radiation from the selected element within coating 12. Similarly, detector 62 is particularly responsive to the fluorescent radiation from the reference element within the reference sample 50. A shielding means 68, disposed between localized areas 46 and 52 and x-ray beams 40 and 42, serves to separate and isolate the radiation 56 and 58 from each other and from the opposite detector. If the second filter is not utilized, it is apparent that characteristic radiation from the reference sample is transmitted in a second path with filter 66 removed. In any event, the selected element characteristic radiation from the coating 12 is selectively filtered by filter 64 in the first path and is received by detector 62.

Detector 60 produces electrical output signals in response to fluorescent radiation counts from the selected element and applies the electrical signals to a wide-band amplifier 70, which amplifier may or may not include some type of signal discrimination circuitry. Amplifier 70 amplifies the electrical signals received from detector 60 and applies an amplified signal representing the selected element radiation counts to a first terminal of ratio counter 72. Similarly, detector 62 produces electrical output signals in response to fluorescent radiation counts from the reference element and applies the electrical signals to a wide-band amplifier 74, which is electronically similar to amplifier 70. Amplifier 74 amplifies the electrical signals received from detector 62 and applies an amplified signal representing the reference element radiation counts to a second terminal of ratio counter 72.

The ratio counter 72 independently accumulates the radiation counts received from wide-band amplifiers 70 and 74. The number of radiation counts received by ratio counter 72 from the reference element via wide-band amplifier 74 is preset at a predetermined number of radiation counts. When the ratio counter 72 accumulates the predetermined number of radiation counts from the reference element via amplifier 74, the ratio counter 72 computes a ratio between the accumulated number of selected element radiation counts and the predetermined number of reference element radiation counts.

In this embodiment, the ratio counter 72 produces an electrical output signal in a binary coded decimal format. The binary coded decimal output signal, representing a ratio of radiation counts between the selected element and reference element fluorescent radiation, may be applied to any digital output device such as, for example, a binary coded decimal-to-analogue converter 76. Converter 76 applies its resulting analogue signal to an analogue output device 78, which device is capable of representing the ratio of counts in the form of a graphical output and the like. Further, the analogue output device 78 may be capable of indicating when the ratio exceeds predetermined limits.

Alternatively or concurrently, the binary coded decimal electrical output signal from the ratio counter 72 could be applied to a binary coded decimal output device 80, which device is capable of displaying the ratio of counts in the form of either a binary or decimal representation.

The apparatus of FIG. 1 can be calibrated by selectively controlling the intensity of fluorescent radiation from the reference element within reference sample 50 relative to the intensity of fluorescent radiation from a coating 12 of a predetermined thickness on a base 14. This is accomplished by making the intensity of fluorescent radiation from the reference element incident upon the detector 62 substantially equal to the intensity of fluorescent radiation from the selected element of coating 12 incident upon the detector 60. Specifically, the calibration is obtained by a means for intercepting the amount of radiation which passes through the filter and which impinges upon the detecting means responsive to the reference sample 50. For example, the calibrating means could be an adjustable wedge 82 which is positioned intermediate the reference sample and the detector 62, for example between the reference sample 50 and the second filter 66 as illustrated by wedge 82 in FIG. 1. Alternatively, the means for intercepting radiation may be located between the second filter 66 and the detector 62 as illustrated by dashed wedge 82'.

The detection circuitry of FIG. 1 can be operatively connected in a different arrangement as depicted in FIG. 2. Particularly, the output of detectors 60 and 62 can be applied to amplifier and discriminator circuits 84 and 86 respectively. Each amplifier and discriminator circuit 84 and 86 comprises known circuits which amplify the electrical output signals received from associated detectors with certain amplification and selectively apply amplified electrical signals exceeding a predetermined level to pulse shapers 88 and 90 respectively. A predetermined level is selected which separates noise and low energy radiation counts from all other higher energy radiation counts. Pulse shapers 88 and 90 produce a pulse of uniform amplitude and duration for each radiation count having an energy level which exceeds the predetermined level. The pulse duration is selected to be slightly less than the duration of an output pulse produced by a detecting means in response to a radiation count such that at a maximum counting rate the pulse shapers will produce a separate pulse for each count. The pulses of uniform amplitude and duration are applied by pulse shapers 88 and 90 to different terminals of a ratio counter 92.

The ratio counter 92 responds to pulses of uniform amplitude and duration to produce an independent count for each pulse received from the pulse shapers 88 and 90 via circuits identified as channel A and channel B respectively. A predetermined number of radiation counts from the reference element, or channel B, can be preset into ratio counter 92. When the ratio counter 92 receives the preset number of reference element radiation counts, counter 92 determines the ratio of the number of selected element radiation counts accumulated from channel A to the number of predetermined reference element radiation counts accumulated from channel B. The ratio of the two counts is used to represent the concentration of the selected element within the coating 12 on base 14. From this ratio the coating thickness, mass per unit area or mass per unit weight of the selected coating element can be easily measured.

The ratio counter 92 is selected to produce a ratio of counts in the form of a binary coded decimal, which output is applied to a compatible output device, for example a binary coded decimal-to-analogue converter 94. The binary coded decimal-to-analogue converter 94 converts the received binary coded decimal ratio of counts signal into an analogue electrical signal and applies the analogue signal directly to a strip chart x-y recorder 95. The ratio of counts from the strip chart recorder 95 is a curve which varies as a function of the ratio of radiation counts. It is anticipated that the analogue output signal of the converter 94 could be used to directly control a process device which is responsive to an electrical control signal, say for example means for applying a coating 12 onto a base 14 (of FIG. 1) having a controllable thickness such as a coating apparatus illustrated by dashed rectangle 96 in FIG. 2. The coating apparatus 96 is capable of varying the thickness of the coating 12 being applied to the moving base 14 as a function of the analogue signal from converter 94.

Alternately, the digital output from the ratio counter 92 could be applied to a digital output device 97, which device could be either a digital recorder, a magnetic tape transport unit or an input-to-digital computer or the like. If the digital output device 97 is a digital computer, for example, the digital output device 97 could be used as part of a digital control loop for controlling the coating apparatus 96.

FIGS. 3 and 4 are graphs which depict the results of operation of one embodiment of an x-ray fluorescence gauge of the present invention for measuring the density of silver milligrams/decimeter'n milligrams/decimter$^2$ (mg/dm$^2$) coated onto a polyester base. In FIG. 3, the radiation from the reference sample 50 is first calibrated relative to the radiation from a 10 calibration standard which is utilized in place of the coating 12 and base 14 illustrated in FIG. 1. The radiation from the reference sample is calibrated by means of a wedge to obtain a ratio of radiation counts therebetween equaling one.

After the calibration as described above is completed, the graph of FIG. 3 is obtained by plotting a ratio of A to B as a function of coating silver densities. In FIG. 3, A represents the radiation from the silver element in the coating 12 on a base 14 which is counted on channel A in FIG. 2. In addition, B represents the radiation counts from the reference sample 50 after it has been calibrated relative to the 10 mg/dm$^2$ calibration sample which is counted on channel B in FIG. 2. The particular curve in FIG. 3 was obtained by presetting B to 100,000 counts and plotting the ratio of radiation counts as a function of silver density in mg/dm$^2$ of various coatings on a base. When the gauge is calibrated relative to the 10 mg/dm$^2$ calibration standard, measurement of a coating silver density in the range of about 50 mg/dm$^2$ results in a ratio of about 3.5. At lower coating silver densities, say for example in the order of 10 mg/dm$^2$, a lower ratio of counts is obtained, for example a ratio in the order of 1.

FIG. 4 is a graph which is similar to that of FIG. 3 except, however, that the reference sample radiation was calibrated relative to radiation from a 50 mg/dm$^2$ calibration standard. Since the radiation from the reference sample is calibrated relative to radiation from a calibration standard containing a higher quantity of silver in mg/dm$^2$, coating silver density measurements in the order of 50 mg/dm$^2$ can be obtained with a ratio of counts of about 1.

Reference to both curves in FIGS. 3 and 4 discloses that a base with 0 mg/dm² of coating silver density produces a minimum ratio of counts. Since the curves of FIGS. 3 and 4 represent operation of a guage using a detecting scheme similar to that set forth in FIG. 2, the characteristics of the detecting means circuitry can be compensated or adjusted such that the apparent radiation contributed by the base is eliminated.

The apparent radiation counts from the base are compensated by a means for inhibiting passage of received radiation counts to the ratio counter. The inhibiting means is preset to prevent the ratio counter 92 from counting radiation counts received by the detector 60 until an equallizing number of coating and base selected element radiation counts are received by the detector 60. The preselected number of equallizing pulses are equal to substantially the number of radiation counts which are attributed to the base. The inhibiting means upon receiving the equallizing number of radiation counts becomes operative to permit radiation counts from the coating and base selected element to be applied directly to and accumulated by the ratio counter 92.

One possible inhibiting means is a preset count controller 98 illustrated in FIG. 5. The preset count controller 98 is electrically connected in channel A between the pulse shaper 88 and ratio counter 92 of FIG. 3. The controller 98 includes a preset counter 100 which receives the output from the pulse shaper 88. The output of counter 100 is connected to one input to an AND gate 102. The other input to AND gate 102 is connected to ratio counter 92.

Operationally, AND gate 102 is disabled or inhibited until the counter 100 receives and counts an equalizing number of radiation counts in channel A approximately equaling the radiation counts from the base. After the counter 100 has received the equalizing number of radiation counts, the counter conditions or enables AND gate 102 to permit the output signal representing the coating and base selected element radiation counts to be applied directly to the ratio counter 92. The ratio counter 92 is thereafter responsive to each radiation count for the purpose of computing a ratio of radiation counts of the coating and base selected element to the radiation counts from the reference sample reference element. By using this inhibiting means, the output from ratio counter 92 is a direct percentage of variation of the coating thickness and the like present on the base.

A monochromatic x-ray source can be used in a manner similar to that of a polychromatic x-ray source as described hereinbefore. An x-ray beam is generated by conventional means and is directed along a predetermined path to bombard a secondary emitter which produces fluorescent radiation having a characteristic wavelength which is slightly less than the absorption edge of the coating and a base selected element. For example, when the selected element is silver as used hereinbefore, the secondary emitter is antimony (Sb). Thereafter, the monochromatic x-ray beam is collimated and used in a manner similar to that for the polychromatic x-ray beam.

FIG. 6 is a graph illustrating the characteristics of this gauge for measuring the concentrations of silver in a known organic binder knife coated on a polyester base. The silver concentrations in mg/dm² varies between ranges of just greater than zero up to about 50 mg/dm². It was determined by experimentation that a polychromatic x-ray beam worked equally as well as a monochromatic x-ray beam for silver concentrations above 50 mg/dm². For this reason, a polychromatic beam is preferred, but not necessarily restricted, for higher silver densities. However, for concentrations below 50 mg/dm², the monochromatic x-ray beam provided a better signal-to-background ratio. For this reason, a monochromatic beam is preferred, but not necessarily restricted, for lower silver concentrations.

In particular, curve 104 of FIG. 6 represents the signal-to-background ratio for the gauge. Curve 106 represents current in milliamps of the electron beam required by the gauge for time constants of 1 second with 1 percent statistical accuracy with a 95 percent confidence level. Curve 108 illustrates allowed variations in base thickness for different silver concentrations. From the graph of FIG. 6, it can be observed that, for a silver concentration of about 30 mg/dm², a base thickness change of approximately 10 percent appears as approximately a 1 percent change in silver. As the silver concentration increases, the sensitivity of the gauge to changes of base thickness rapidly decreases.

Thus, it is apparent that the teachings of this invention can be utilized for measuring the coating thickness on a moving web wherein the base thickness varies widely. Although the base thickness can vary widely, the thickness of the coating thereon is measured within a very narrow range. At larger silver concentrations in mg/dm², a better signal-to-background ratio for the characteristic radiation of silver can be obtained as evidenced by curve 104 whereby the allowed percentage change in base thickness becomes even wider.

FIG. 7 illustrates one example of an x-ray fluorescence gauging apparatus. The apparatus includes an x-ray source 110 which may be, for example, a Machlett x-ray tube, type AEG-50, having a tungsten anode, a gouging platform 112 which is illustrated with greater detail in FIG. 8, a first detector 114 and a second detector (not shown) disposed behind detector 114. The detectors may be, for example, a Harshaw sodium iodine scintillation crystal with an XP-1010 Amprex photomultiplier tube. A polychromatic x-ray beam is generated within a tubular chamber 116 of source 110 by conventional means. The polychromatic x-rays exit from chamber 116 through an opening 122. The x-rays are passed through a collimator 124 which separates the single polychromatic x-ray beam into two separate spaced diverging beams, one of which is directed to irradiate the coating and base located on one part of the gauging platform 112 and the other of which is directed to irradiate a reference sample located on a different part of the gauging platform 112. The gauging platform 112 supports an aluminum shielding member 126 which isolates radiation between the coating and base and the reference sample. Detector 114 is positioned on one side of shielding member 126 while the other detector (not shown) is positioned on the other side thereof but adjacent detector 114 and in alignment therewith. Each detector has a filter, for example filter 128 for detector 114, positioned intermediate the gauging platform 112 and each detector. Adjusting means, generally designated as 130, are provided for moving a wedge (not shown) relative to the detector behind detector 114. Also, adjusting means, including rails 132 over which the detectors can be moved, are provided such that the geometrical position of the detectors can be set relative to the source 110 to permit the detectors to receive the maximum radiation from the irradiated coating and base and reference sample.

FIG. 8 is a fragmentary sectional end view illustrating in detail the gauging platform 112. The platform 112 has a planar plate member 134 extending on each side of the aluminum shield 126. Shield 126 is mechanically connected to plate member 134 by means of conventional fasteners and a support. Plate member 134 has on one side thereof a receptacle in the form of a hollowed out area 136 into which the reference sample 138 is inserted to be irradiated by one x-ray beam, illustrated by dashed line 140. On the opposite side of shield 126, plate member 134 has an aperture 142 through which the other x-ray beam, illustrated by dashed line 144, passes to irradiate a web 146 comprising a coating, having the selected element, on a moving base. The web 146 being measured would be moving in a longitudinal direction either into or out of the sheet of drawing. A pair of side walls 148 and 150 are joined by fasteners to plate member 134 to confine the characteristic radiation in the particular area being monitored by the respective detectors.

A gauging platform as described permits the x-ray gauging apparatus to be movable whereby any preselected area or surface of the moving web can be easily monitored. From FIG. 8, it is apparent that the reference sample 138 and the web 146 comprising a coating and base are substantially in the same plane. When the reference element within the reference sample 138 is selected to be the same element as the selected element within the web 146, variations in the excitation potential of the x-ray source, in the current intensity of the electron source used to generate the electron beam and the like are automatically compensated since the radiation from the reference sample 138 and web 146 will vary proportionally in response to such variations. Similarly, the ratio of radiation counts will be substantially unaffected. Further, normal variations in web flutter and the like will not substantially affect the radiation received by its detector and subsequently will not effect the ultimate ratio of counts representing the coating characteristics being monitored.

It is readily apparent that modifications, changes, improvements, other uses and the like can be made of the present invention and are deemed to be within the scope of the appended claims.

I claim:

1. A method for comparing the quantity of a selected element within a coating on a moving base with a predetermined quantity of said selected element within a reference sample, said method comprising the steps of generating an x-ray beam having an excitation potential which is sufficient to excite said selected element to emit its characteristic radiation;

collimating said x-ray beam into a first x-ray beam and a second x-ray beam;

directing said first beam to irradiate a first localized area of said coating on the base and directing said second beam to irradiate a second localized area of said reference sample, wherein said coating within said first localized area produces fluorescent characteristic radiation of said selected element, fluorescent characteristic radiation of other elements of lower atomic number than said selected element, and backscattered radiation, and wherein said reference sample within said second localized area produces fluorescent characteristic radiation of said selected element, fluorescent characteristic radiation of other elements of lower atomic number than said selected element, and backscattered radiation;

isolating said fluorescent and backscattered radiation of said coating on the base from said fluorescent and backscattered radiation of said reference sample;

filtering said fluorescent and backscattered radiation from said coating and filtering said fluorescent and backscattered radiation from said reference sample to increase the ratio of characteristic radiation from said selected element to the characteristic radiation from said other elements and backscattered radiation;

detecting said selected element characteristic radiation from said coating on the base and from said reference sample and converting said selected element characteristic radiation from said coating into a first signal and said selected element characteristic radiation from said reference sample into a second signal which signals respectively represent the number of counts of said selected element characteristic radiation; and producing a ratio of counts between the selected element characteristic radiation from said coating and the selected element characteristic radiation from said reference sample represented by said first and second signals.

2. The method of claim 1 further comprising the step of indicating when said ratio of counts exceeds predetermined limits.

3. The method of claim 2 further comprising the step of intercepting a portion of said radiation from said reference sample to selectively calibrate the amount of characteristic radiation being detected from said selected element within said reference sample to permit indication of deviation of said selected element within said coating from a standard and to permit linear indication of the coating weight of said selected element per unit area.

4. A method for comparing the quantity of silver in a coating on a base with a predetermined quantity of silver in a reference sample, said method comprising the steps of generating an x-ray beam having an excitation potential which is sufficient to excite said silver to emit its characteristic radiation;

collimating said x-ray beam into a first x-ray beam and a second x-ray beam;

directing said first beam to irradiate a first localized area of said coating on the base and directing said second beam to irradiate a second localized area of said reference sample, wherein said coating within said first localized area produces fluorescent characteristic radiation of said silver, fluorescent characteristic radiation of other elements of lower atomic number than said silver, and backscattered radiation, and wherein said reference sample within said second localized area produces fluorescent characteristic radiation of said silver, fluorescent characteristic radiation of other elements of lower atomic number than said silver, and backscattered radiation;

isolating said fluorescent and backscattered radiation of said coating from said fluorescent and backscattered radiation of said reference sample;

filtering said fluorescent and backscattered radiation from said coating and filtering said fluorescent and backscattered radiation from said reference sample to increase the ratio of characteristic radiation from said silver to the characteristic radiation from said other elements and backscattered radiation;

detecting said silver characteristic radiation from said coating and from said reference sample and converting said detected silver characteristics radiation from said coating into a first signal and said detected silver characteristic radiation from said reference sample into a second signal which signals respectively represent the number of counts of silver characteristic radiation; and producing a ratio of counts between said silver characteristic radiation from the coating and said silver characteristic radiation from said reference sample represented by said first and second signals.

5. A method for comparing the quantity of a selected element within a coating on a moving base with a predetermined quantity of said selected element within a reference sample, said method comprising the steps of generating an x-ray beam having an excitation potential which is sufficient to excite said selected element to emit its characteristic radiation;

collimating said x-ray beam into a first x-ray beam and a second x-ray beam;

directing said first beam to irradiate a first localized area of said coating on the base and directing said second beam to irradiate a second localized area of said reference sample, wherein said coating within said first localized area produces fluorescent characteristic radiation of said selected element, fluorescent characteristic radiation of other elements of lower atomic number than said selected element, and backscattered radiation, and wherein said reference sample within said second localized area produces fluorescent characteristic radiation of said selected element, fluorescent characteristic radiation of other elements of lower atomic number than said selected element, and backscattered radiation;

isolating said fluorescent and backscattered radiation of said coating on the base from said fluorescent and backscattered radiation of said reference sample;

intercepting a portion of said radiation from said reference sample to selectively calibrate the amount of characteristic radiation being detected from said selected element within said reference sample to permit indication of deviation of said selected element within said coating from a standard and to permit linear indication of the coating weight of said selected element per unit area;

filtering said fluorescent and backscattered radiation from said coating and filtering said fluorescent and backscattered radiation from said reference sample to increase the ratio of characteristic radiation from said selected element to the characteristic radiation from said other elements and backscattered radiation;

detecting said selected element characteristic radiation from said coating on the base and from said reference sample and converting said selected element characteristic radiation from said coating into a first signal and said selected element characteristic radiation from said reference sample into a second signal which signals respectively represent the number of counts of said selected element characteristic radiation; and producing a ratio of counts between the selected element characteristic radiation from said coating and the selected element characteristic radiation from said reference sample represented by said first and second signals.

UNITED STATES PATENT OFFICE
CERTIFICATE OF CORRECTION

Patent No. 3,562,525                         Dated February 9, 1971

Inventor(s) Nikiforos Constantine and Larry L. Hobbs

It is certified that error appears in the above-identified patent and that said Letters Patent are hereby corrected as shown below:

Column 1, Line 65, delete "22,926,257" and insert --2,926,257--. Column 2, Line 66, delete "minumum" and insert --minimum--. Column 3, Line 8, delete "the" (third occurrence); Column 3, Line 24, delete "nonochroma and insert --monochromatic--; Column 3, Line 50, delete "areal" and insert --area--. Column 6, Line 41, insert "1 before --milli--; Column 6, Line 42, delete "decimeter'n' and insert --decimeter$^2$--; Column 6, Line 42, delete "milligrams/decimter$^2$"; Column 6, Line 45, insert "mg/dm$^2$ before --calibration--. Column 7, Line 4, delete "guage" and insert --gauge--. Column 8, Line 22, delete "gouging" and insert --gauging--.

Signed and sealed this 8th day of June 1971.

(SEAL)
Attest:

EDWARD M. FLETCHER, JR.                    WILLIAM E. SCHUYLER, J
Attesting Officer                          Commissioner of Patent